United States Patent

Bompeix et al.

[11] Patent Number: 5,858,436
[45] Date of Patent: Jan. 12, 1999

[54] PROCESS FOR THE TREATMENT OF FRUITS AND VEGETABLES

[75] Inventors: Gilbert Bompeix, Paris; Alberto Sardo, Le Chesnay, both of France

[73] Assignee: Xeda International, France

[21] Appl. No.: 816,053

[22] Filed: Mar. 11, 1997

[30] Foreign Application Priority Data

Mar. 12, 1996 [FR] France .................................. 96 03100

[51] Int. Cl.⁶ ....................................................... A23B 7/14
[52] U.S. Cl. ........................... 426/321; 426/442; 426/520
[58] Field of Search ............................. 426/89, 102, 262, 426/268, 270, 302, 310, 333, 335, 532, 541, 544, 546, 615, 442, 520, 321

[56] References Cited

U.S. PATENT DOCUMENTS

| | | | |
|---|---|---|---|
| 2,615,814 | 10/1952 | Geary | 426/268 |
| 4,638,095 | 1/1987 | Chang et al. | 568/326 |
| 5,023,017 | 6/1991 | Todd, Jr. | 426/413 X |
| 5,139,562 | 8/1992 | Vaughn et al. | 71/88 |
| 5,209,870 | 5/1993 | Todd, Jr. | 426/429 X |

FOREIGN PATENT DOCUMENTS

| | | |
|---|---|---|
| 0 161 989 A1 | 11/1985 | European Pat. Off. . |
| 0 287 946 | 10/1988 | European Pat. Off. . |
| 0 316 293 | 5/1989 | European Pat. Off. . |
| 0 512 580 A1 | 11/1992 | European Pat. Off. . |
| 1 471 173 | 3/1967 | France . |
| 2 663 198 | 12/1991 | France . |
| 2 681 763 | 4/1993 | France . |
| 91/05479 | 5/1991 | WIPO . |
| 91/18058 | 11/1991 | WIPO . |
| 92/10934 | 7/1992 | WIPO . |
| 92/17070 | 10/1992 | WIPO . |
| 94/12041 | 6/1994 | WIPO . |
| 95/09536 | 4/1995 | WIPO . |
| 95/12311 | 5/1995 | WIPO . |

*Primary Examiner*—Milton Cano
*Attorney, Agent, or Firm*—Wenderoth, Lind & Ponack, L.L.P.

[57] ABSTRACT

A process for the treatment of fruits or vegetables after harvesting by heating to a temperature of 40° to 60° C. a treatment composition including, in an aqueous vehicle, a terpenic compound, and then bringing the fruits or vegetables into contact with the composition at such temperature for a period of less than or equal to 10 minutes.

10 Claims, No Drawings

PROCESS FOR THE TREATMENT OF FRUITS AND VEGETABLES

The present invention relates to a process for the treatment of fresh fruits and vegetables.

After their harvest, fresh fruits and vegetables are commonly stored, for a period which may be relatively long, before being marketed for rapid consumption.

During this period of storage, it is important that the fruits and vegetables do not lose their qualities, especially their appearance attributes. These may be damaged, in particular by the proliferation of fungi at the surface of the fruit or of the vegetable, leading to rapid spoilage of the fruit or of the vegetable affected, or by the phenomenon of scald which leads to browning of the skin of the fruits or vegetables due to oxidized products, which accumulate in the waxy surface layer, which phenomenon may spread to the pulp of the fruits. These spoilages are even more rapid if the fruit or the vegetable has micro-wounds consisting of cuts in the skin.

Numerous products exist and are available for treating fruits and vegetables against this spoilage during storage. However, they often have the disadvantage of exhibiting risks of toxicity for the consumer. The new synthetic products which are commercially available and intended to overcome this disadvantage have, nevertheless, the disadvantage of a high price, linked to the cost of their development.

It would be desirable to be able to switch to molecules which are already known to be easily accessible, and which exhibit a low or zero phytotoxicity, but most of the molecules tested have proved to be ineffective or practically inert for controlling oxidative physiopathy of fruits and vegetables or fungal development thereon.

The object of the present invention is precisely to provide a process for the treatment of fruits and vegetables after harvesting, using widely available molecules, especially products of natural origin, not exhibiting risks of toxicity for the consumer.

It was while trying to achieve this aim that it was discovered in the present invention that terpenic compounds and antioxidants, which are molecules considered up until now to be ineffective in the treatment of fruits and vegetables by contact with a liquid composition, prove to be highly effective when they are used in an aqueous vehicle at a temperature greater than room temperature and less than the temperature for damaging the fruits and vegetables by heat.

For the purposes of the present description, the term "ineffective" designates products which are completely inactive in aqueous solution or dispersion at room temperature, in a treatment of fruits and vegetables, especially an antifungal or antiscald treatment, or products which are very weakly active in solution or dispersion at room temperature at the usual treatment doses but not providing adequate protection for the fruits and vegetables, or providing good results only for applicable doses which are very considerably higher than the usual doses, it being possible for these excessive doses to be toxic.

It is already known that the immersion of a fruit, especially peaches or apples, in hot water at a temperature of about 45° to 60° C. made it possible to reduce the damage thereof which is caused by the development of fungi. It is also known to combine a hot water treatment with a low dose of fungicidal products which are usually used in aqueous compositions, in order to increase the efficacy thereof for the control of fungi.

However, the literature does not describe the potentiating effect exerted by hot water on substances recognised to be ineffective in the treatment of fruits and vegetables.

The subject of the invention is thus a process for the treatment of fruits or vegetables after harvesting, characterized in that it comprises the steps consisting in:

heating to a temperature of 40° to 60° C. a liquid treatment composition comprising, in an aqueous vehicle, at least one treatment agent chosen from a polyphenol-type antioxidant, a terpenic compounds and mixtures thereof, and bringing the fruits or vegetables into contact with the liquid treatment composition at the said temperature for a period of less than or equal to 10 minutes.

The process of the invention very advantageously applies to antioxidant treatments where the antioxidant is a polyphenol.

The polyphenols manifest, by virtue of the process of the invention, a sufficient antioxidant effect to be effective in an antiscald treatment. It will be noted that the antioxidant compounds also have a very positive effect on the resistance of the fruits and vegetables to fungal infections.

Polyphenol is understood to mean, according to the invention, compounds comprising one or more phenyl rings substituted with at least two hydroxyl groups.

Examples of such polyphenols are quercetin and rosmaridiphenol of respective formulae:

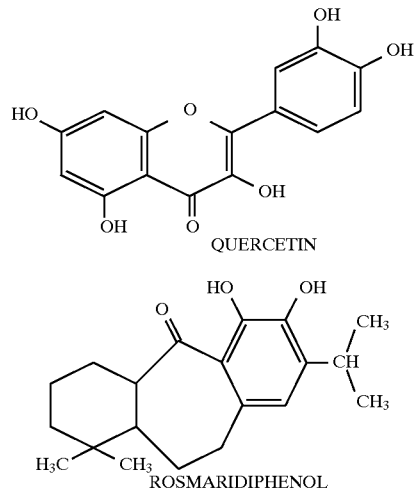

The preferred polyphenols used according to the invention are of natural origin. Advantageously, the polyphenols are extracted from plants or fruits. They may be used after extraction in the form of complex mixtures of several polyphenols. These mixtures preferably contain at least 70%, better still at least 80% and more preferably at least 90% of polyphenols. However, less concentrated mixtures may also be used. Such natural extracts, with a higher or lower polyphenol concentration, are easily accessible.

Persons skilled in the art can in particular obtain them using known extraction and purification methods.

The terpenic compounds may be used in the present invention to provide a fungicidal treatment of fruits and vegetables. Fungicidal treatments, based on terpene, are already known, but use the terpenic compounds in vapour phase by volatilization of the said compound in the treatment chamber. Treatments of fruits and vegetables with liquid compositions containing terpenes have proved ineffective up until now, because they required a large dose of treatment compositions and frequent renewal of the applications.

The terpenes which may be used according to the present invention are preferably monoterpenes, such as pinene or limonene. The oxygenated monoterpenes are preferable to the simply hydrocarbon monoterpenes. There may be mentioned, as example, terpineol, eucalyptol, menthol, menthone, carvone, cineole and citronellal. The compounds of the terpene class of natural origin are preferred although these compounds may also be accessible via the synthetic route.

The treatment composition is advantageously provided in the form of a solution or dispersion in the said aqueous vehicle.

According to whether the product is soluble in water to a greater or lesser degree, the composition may also comprise, in addition, at least one surfactant chosen in a manner known per se from nonionic, anionic, cationic and amphoteric surfactants.

The content of the said product in the treatment composition is advantageously from 100 to 10,000 ppm. In particular, compositions comprising from 200 to 5,000 ppm of terpenic compounds, as well as compositions comprising from 500 to 10,000 ppm of polyphenols, are preferred.

Before application to the fruits or vegetables, the liquid composition is heated to a temperature of 40° to 60° C., preferably 45° to 55° C., better still 48° to 52° C., for example 50° C.

According to a preferred embodiment, the bringing into contact with the fruits or vegetables takes place so as to superficially heat the fruits and vegetables to a temperature of at least 35° C., better still of at least 40° C., for example of 45°–50° C. Thus, the application of the composition to the fruits or vegetables is itself advantageously performed by immersion or showering. A simple spraying or nebulization of the treatment composition is often insufficient to superficially heat the fruits or vegetables to the desired temperature, thereby making the process of the invention ineffective.

The techniques used in the invention carry out a massive application of the liquid composition. In the case of showering or similar techniques, it is preferable to apply the composition in the form of a continuous jet of liquid. The sprinkling on the fruits or vegetables of large drops whose size is not less than about 100 μm is nevertheless not excluded.

The duration of this operation is very short, generally less than or equal to 10 minutes, especially from 30 seconds to 10 minutes, advantageously from 30 seconds to 5 minutes. A contact time of 2 to 3 minutes is most often sufficient.

It goes without saying that persons skilled in the art will adjust the time during which the fruits and vegetables are in contact with the treatment composition and the temperature of the treatment composition so as not to damage the fruits or vegetables and to avoid onset of cooking.

The application of the compositions is preferably made so that the quantity of treatment agent applied corresponds to the usual applicable doses of treatment agent in the treatments in question. This quantity may be advantageously from 0.4 to 40 g of the said agent per tonne of fruits or vegetables treated.

Preferably, the quantity of antioxidant used will be from 2 to 40 g/tonne and the quantity of terpenic compound will be from 0.4 to 20 g/tonne of fruits or vegetables treated.

When the desired duration of treatment with the hot composition is achieved, the application may be stopped by any known means, especially by simply stopping the sprinkling or removing the fruits or vegetables from the immersion tank. The fruits or vegetables are then capable of being stored for subsequent distribution.

In an advantageous variant, in particular in the case of heat-sensitive fruits or vegetables, the process may comprise, in addition, a step consisting in rapidly cooling the fruits or vegetables which have been brought into contact with the hot treatment composition, up to a temperature of less than or equal to room temperature.

This cooling may be performed by circulation of air or by contact with water (especially immersion or sprinkling) whose temperature is less than or equal to room temperature.

Surprisingly, the process of the invention makes it possible, with a single application of treatment composition at the usual dose of active substance and an extremely short treatment time, to give a lasting protection to the fruits and vegetables against oxidation or fungal infections.

The process is all the more advantageous when the treatment agents are natural substances whose ingestion is harmless for the consumer.

The examples below illustrate the invention.

I—Antiscald treatment on MELROSE apples

EXAMPLES 1 to 3

Melrose apples are treated, after harvesting, with a composition comprising concentrated polyphenols extracted from spinach (subsequently, denoted NAO) in aqueous solution at a concentration of 0.4% by weight (4,000 ppm), in an amount of 20 g of NAO per tonne of apples. The treatment consisted of immersion for two minutes at a temperature indicated in Table 1 below.

The fruits removed from the composition after two minutes of immersion were stored in the open air at a temperature of 5° C. for a period of 9 minutes at the end of which the scald level and the appearance of the fruit are evaluated.

The scald level is expressed by the number of fruits having brown spots, typical of this physiopathy, relative to the number of fruits treated.

The appearance of the fruits was noted on a scale having three levels:

+++: unaffected fruit

++: fruit with small dotted spots (different in nature from the "scald" brown spots)

+: fruit with few small spots not exceeding ¼ of the fruit o: fruit with numerous spots exceeding half of the fruit—unacceptable appearance from the commercial point of view.

The results of these evaluations are given in Table 1 below where there are also presented the results of Examples 4 and 5 and of the comparative Examples 1 to 3 explicitly stated below.

EXAMPLES 4 and 5

The treatment of Example 1 was reproduced with a composition containing, in addition, 4,000 ppm of ethoxylated nonylphenol containing 30 units of ethylene oxide (NP-30 EO).

Comparative Examples 1 and 2

The treatment compositions of Examples 1 and 4 are used to treat the same quantity of apples by immersion at room temperature for a period of 20 minutes.

Comparative Example 3

The same quantity of apples is treated with a composition comprising diphenylamine in aqueous solution at a concentration of 500 ppm, by immersion at room temperature for a period of 2 minutes.

makes it possible to record a very good efficacy of l-carvone which is practically ineffective in aqueous composition at room temperature. Indeed, only 4% of the grey moulds developed after one month of storage at 5° C. instead of the 84% present on the control fruits treated at room temperature.

TABLE 1

| Example | Composition | Immersion time (min) | Temperature (°C.) | Scald level (%) | Appearance |
|---|---|---|---|---|---|
| Control | — | — | — | 49.3 | o |
| 1 | NAO (4,000 ppm) | 2 | 40 | 23.9 | ++ |
| 2 | NAO (4,000 ppm) | 2 | 45 | 15.6 | ++ |
| 3 | NAO (4,000 ppm) | 2 | 50 | 12.5 | +++ |
| 4 | NAO (4,000 ppm) NP-30EO (4,000 ppm) | 2 | 40 | 18.6 | ++ |
| 5 | NAO (4,000 ppm) NP-30EO (4,000 ppm) | 2 | 50 | 9.3 | + |
| Comp. 1 | NAO (4,000 ppm) | 20 | ambient | 27.6 | ++ |
| Comp. 2 | NAO (4,000 ppm) NP-30EO (4,000 ppm) | 20 | ambient | n.d.(*) | o |
| Comp. 3 | diphenylamine | 2 | ambient | 24.7 | o |

(*)the appearance of the apples is too damaged for a reliable evaluation of the scald level to be made.

II—Antifungal treatment of Golden apples

EXAMPLE 6

A water-dispersible emulsion of l-carvone is prepared having the following composition by weight:

l-carvone: 30%

Ethoxylated nonylphenol at 10 units of ethylene oxide: 70%

This emulsion is diluted in water in an amount of 1.33 kg/hl to provide a treatment composition titrating 4,000 ppm of l-carvone.

A batch of Golden apples is treated by immersion in this composition for a period of 2 minutes, at a temperature of 50° C., in an amount of 10 g of l-carvone per tonne of apples.

After having been removed from the immersion bath, the apples are inoculated with Botrytis cinerea grey mould, and then stored at a room temperature of 50° C.

After different storage times, the successful inoculation rate, that is to say the number of strains which developed compared with the total number of strains inoculated, is measured.

Comparative Example 4

Example 6 is reproduced, the only exception being that the immersion occurs in the composition at room temperature.

The results of these examples are given in Table 2 below.

TABLE 2

| EXAMPLE | Immersion temperature (°C.) | Successful inoculation rate (%) after | | |
|---|---|---|---|---|
| | | 14 days | 23 days | 30 days |
| 6 | 50 | 0 | 4 | 4 |
| Comparative 4 | ambient | 48 | 60 | 84 |

This example proves that the treatment according to the invention at a temperature of 50° C. and for only 2 minutes

We claim:

1. Process for the treatment of fruits or vegetables after harvesting, comprising the steps of:
   a. heating to a temperature of 40° to 60° C. a liquid treatment composition comprising, in an aqueous vehicle, at least one terpenic compound and
   b. placing the fruits or vegetables in the liquid treatment composition at the said temperature for a period of 2 to 10 minutes by immersion or showering.

2. Process according to claim 1, wherein the terpenic compound is an oxygenated monoterpene of natural origin.

3. Process according to claim 2, wherein the monoterpene is l-carvone.

4. Process according to claim 1, wherein the treatment composition comprises, in addition to said terpenic compound, at least one surfactant selected from the group consisting of nonionic, anionic, cationic and amphoteric surfactants.

5. Process according to claim 1, wherein the treatment composition comprises from 100 to 5,000 ppm of the terpenic compound.

6. Process according to claim 1, wherein the dose of terpenic compound used is from 0.4 to 40 grams per ton of fruits or vegetables.

7. Process according to claim 1, further comprising the step of rapidly cooling the fruits or vegetables brought into contact with the heated treatment composition until a temperature of less than or equal to room temperature is obtained.

8. Process according to claim 7, wherein the fruits are cooled by circulation or air or by contact with water, whose temperature is less than or equal to room temperature.

9. Process according to claim 1, wherein the treatment composition is heated to a temperature of between 45° and 55° C.

10. Process according to claim 9, wherein the treatment composition is heated to a temperature of between 47° and 52° C.

* * * * *